US010250696B2

(12) United States Patent
Lang et al.

(10) Patent No.: US 10,250,696 B2
(45) Date of Patent: Apr. 2, 2019

(54) PRESERVING STATEFUL NETWORK CONNECTIONS BETWEEN VIRTUAL MACHINES

(71) Applicant: INTERNATIONAL BUSINESS MACHINES CORPORATION, Armonk, NY (US)

(72) Inventors: Jakob C. Lang, Boeblingen (DE); Angel Nunez Mencias, Boeblingen (DE); Thomas Pohl, Boeblingen (DE); Martin Troester, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 95 days.

(21) Appl. No.: 15/219,390

(22) Filed: Jul. 26, 2016

(65) Prior Publication Data

US 2018/0034916 A1 Feb. 1, 2018

(51) Int. Cl.

*H04L 12/721* (2013.01)
*H04L 29/12* (2006.01)
*H04L 29/08* (2006.01)

(52) U.S. Cl.

CPC ............ *H04L 67/145* (2013.01); *H04L 45/66* (2013.01); *H04L 61/2015* (2013.01); *H04L 61/2514* (2013.01); *H04L 61/2521* (2013.01)

(58) Field of Classification Search

CPC ..... H04L 41/12; H04L 45/02; H04L 41/0803; H04L 12/4641; H04L 45/00; H04L 41/0816; H04L 45/64; H04L 41/5096; H04L 41/0813; H04L 29/06; H04L 29/08072; H04L 49/70; H04L 67/16; H04L 12/6418; H04L 41/0806; H04L 45/586

See application file for complete search history.

(56) References Cited

U.S. PATENT DOCUMENTS 7,289,462 B1 10/2007 Mizell et al.
7,587,518 B2 9/2009 Bahl
7,984,125 B2 7/2011 Shaw, Jr. et al.
(Continued)

OTHER PUBLICATIONS

Thiagarajan, Mahesh, "Reserved IP Addresses for Cloud Services & Virtual Machines," May 14, 2014, pp. 1-7.
(Continued)

*Primary Examiner* — Larry D Donaghue

(74) *Attorney, Agent, or Firm* — William A. Kinnaman, Jr., Esq.; Blanche E. Schiller, Esq.; Heslin Rothenberg Farley & Mesiti P.C.

(57) ABSTRACT

Stateful network connections between a first virtual machine and at least a second virtual machine are preserved during a suspend and resume cycle. The virtual machines are interconnected by a network. A control instance is provided to manage a routing of network traffic of the virtual machines to the network. In case of a suspend operation, the control instance tracks network addresses of each virtual machine, whereas in case of a resume operation, the control instance sets up a router for each virtual machine and requests new network addresses for each router. The control instance configures a network address translation on the router assigned to each virtual machine to map the new network addresses to the network addresses used before suspending the virtual machines.

20 Claims, 7 Drawing Sheets

(56) References Cited

U.S. PATENT DOCUMENTS

| | | | | |
|---|---|---|---|---|
| 8,806,266 | B1 * | 8/2014 | Qu | G06F 11/1484 714/13 |
| 8,862,735 | B1 | 10/2014 | Singh et al. | |
| 9,374,302 | B2 | 6/2016 | Bays et al. | |
| 9,600,315 | B2 | 3/2017 | Srinivasan et al. | |
| 2009/0300605 | A1 * | 12/2009 | Edwards | G06F 9/5077 718/1 |
| 2009/0327392 | A1 * | 12/2009 | Tripathi | G06F 15/16 709/201 |
| 2011/0246669 | A1 * | 10/2011 | Kanada | G06F 9/4856 709/238 |
| 2012/0054367 | A1 * | 3/2012 | Ramakrishnan | G06F 9/4856 709/242 |
| 2012/0151480 | A1 | 6/2012 | Diehl et al. | |
| 2013/0042236 | A1 * | 2/2013 | Kagan | G06F 9/45558 718/1 |
| 2013/0247034 | A1 * | 9/2013 | Messerli | G06F 9/45533 718/1 |
| 2014/0040889 | A1 * | 2/2014 | Baset | G06F 9/455 718/1 |
| 2014/0040892 | A1 * | 2/2014 | Baset | G06F 9/455 718/1 |
| 2015/0074453 | A1 * | 3/2015 | Fleming | G06F 9/455 714/6.23 |
| 2015/0130813 | A1 * | 5/2015 | Taraki | G06F 1/3209 345/441 |

OTHER PUBLICATIONS

Oracle Corporation, "Assigning a Reserved IP Address to a DHCP Client," System Administration Guide: IP Services, downloaded from internet Apr. 5, 2016, p. 1.

* cited by examiner

PRESERVING STATEFUL NETWORK CONNECTIONS BETWEEN VIRTUAL MACHINES

BACKGROUND

One or more aspects relate, in general, to data processing systems, and in particular, to preserving stateful network connections between virtual machines during a suspend and resume cycle.

In virtualized computer systems, it may be desirable in certain circumstances to suspend a virtual machine (VM) and resume it at a later time. For instance, in order to save resources concerning e.g. computing power, energy or memory, it may be worth it to suspend a virtual machine and resume it at a later time.

Concepts for the assignment and retrieval of permanent/static addresses to/from networked machines through a Dynamic Host Configuration Protocol (DHCP) server are known in the art. This enables a network administrator to manage all of the addresses for all networked machines through the centralized DHCP server, and in particular, allows the network administrator to reclaim a permanent or static network address from a machine without having to physically go to the machine. This allows having a larger potential amount of VMs than network addresses.

SUMMARY

Shortcomings of the prior art are overcome and additional advantages are provided through the provision of a computer-implemented method of preserving stateful network connections between virtual machines during a suspend and resume cycle, the virtual machines being interconnected by a network, and wherein a control instance is provided to manage a routing of network traffic of the virtual machines to the network. The computer-implemented method including, in case of a suspend operation, tracking by the control instance network addresses of a first virtual machine and a second virtual machine; and in case of a resume operation: setting up by the control instance a first router for the first virtual machine and a second router for the second virtual machine, and requesting new network addresses for the first router and the second router; and configuring by the control instance network address translation on the first router and the second router assigned to the first virtual machine and the second virtual machine to map the new network addresses to the network addresses used before suspending the first virtual machine and the second virtual machine.

Computer program products and systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

Aspects of the present invention together with the above-mentioned and other objects and advantages may best be understood from the following detailed description of the embodiments, but not restricted to the embodiments, wherein is shown in.

DETAILED DESCRIPTION

Figure 1:
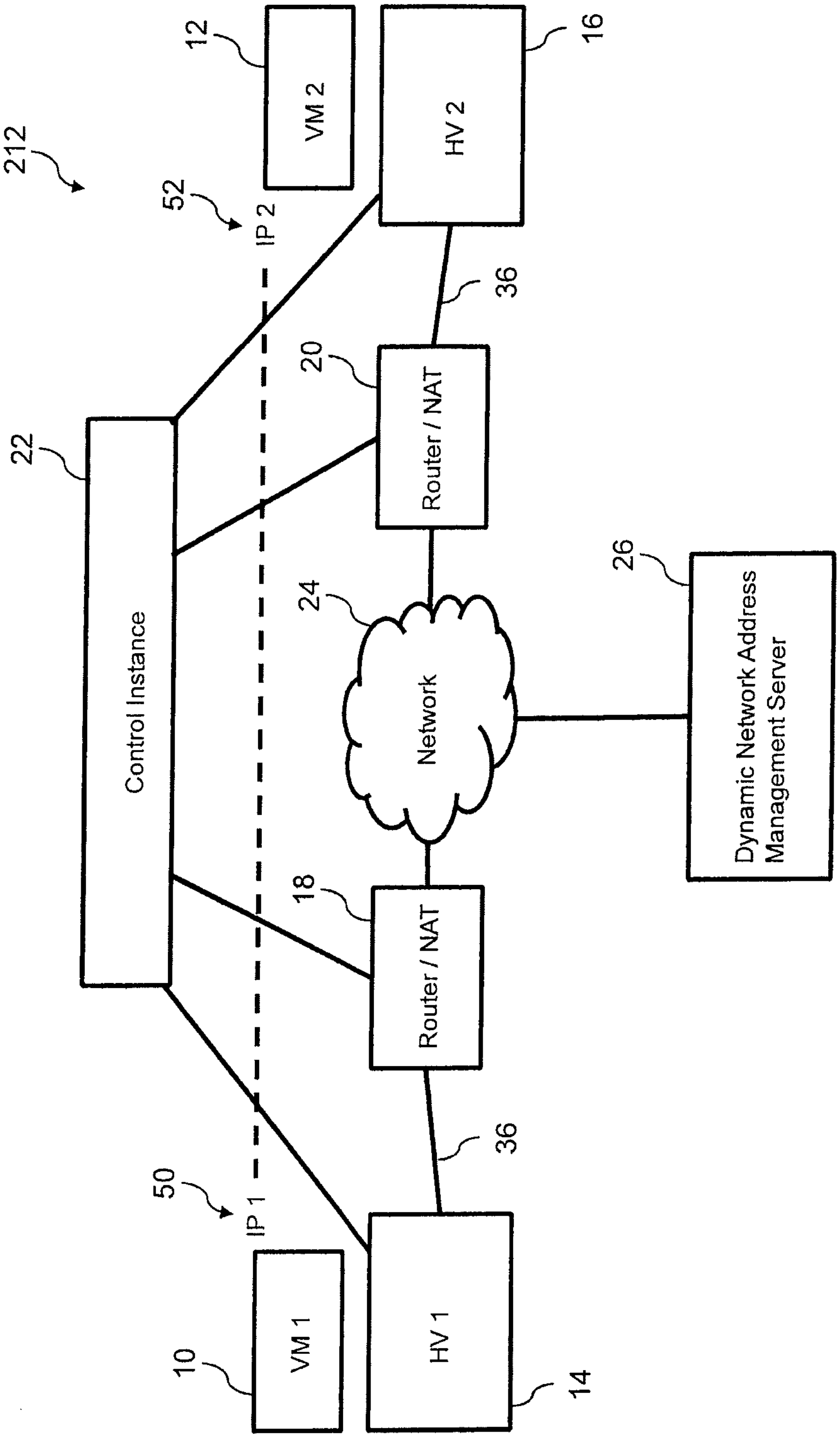
FIG. 1 a high level design of a computer system implementing an embodiment of the invention during the virtual machines running.

In the drawings, like elements are referred to with equal reference numerals. The drawings are merely schematic representations, not intended to portray specific parameters of aspects of the invention. Moreover, the drawings are intended to depict only typical embodiments of aspects of the invention and therefore should not be considered as limiting the scope of aspects of the invention.

The illustrative embodiments described herein provide a method, system, and computer program product for preserving stateful network connections between a first virtual machine and at least a second virtual machine. The illustrative embodiments are sometimes described herein using particular technologies only as an example for the clarity of the description. The illustrative embodiments may be used for preserving stateful network connections between a first virtual machine and at least a second virtual machine during a suspend and resume cycle, the virtual machines being interconnected by a network, wherein a control instance is provided to manage the routing of network traffic of the virtual machines to the network.

FIG. 1 depicts a high level design of a computer system 212 implementing an embodiment of the invention, shown in state where the virtual machines 10, 12 are running. Stateful network connections are established between the first virtual machine 10 and the second virtual machine 12. The virtual machines 10, 12 are interconnected by a network 24. A control instance 22 is provided to manage the routing of network traffic of the virtual machines 10, 12 to the network 24. The virtual machines 10, 12 are connected over a network 36 via the hypervisors 14, 16 to routers 18, 20, respectively, which are able to perform network address translation (NAT), so that the virtual machines 10, 12 are connected via the routers 18, 20 to the external network 24. The network 24 is connected to an external dynamic network address management server 26, which may be configured as a DHCP server. Hypervisors 14, 16 as well as the routers 18, 20 are controlled by the control instance 22, which may be implemented as a management instance of the virtual machines 10, 12.

The virtual machines 10, 12 are starting and retrieving a network address 50, 52 from the official dynamic network address management server 26. Then, both virtual machines 10, 12 establish connections to each other. By this way, the virtual machines 10, 12 are communicating in the running state over the network 24 with network addresses 50, 52, like IP addresses, e.g., named as IP1 and IP2, respectively.

According to one aspect, the virtual machines 10, 12 may preserve these network addresses 50, 52 during a suspend and resume cycle of the virtual machines 10, 12 and may be able to communicate with each other, using the same network addresses 50, 52 after resuming, where the original network addresses 50, 52 may be used by other virtual machines in the network 24.

The network 24 may be implemented as a physical network or a virtual network.

For applying one or more aspects, the virtual machines 10, 12 may also be implemented as containers, such that the hypervisors 14, 16 may be implemented as container hosts or operating systems being able to start a container.

Figure 2:
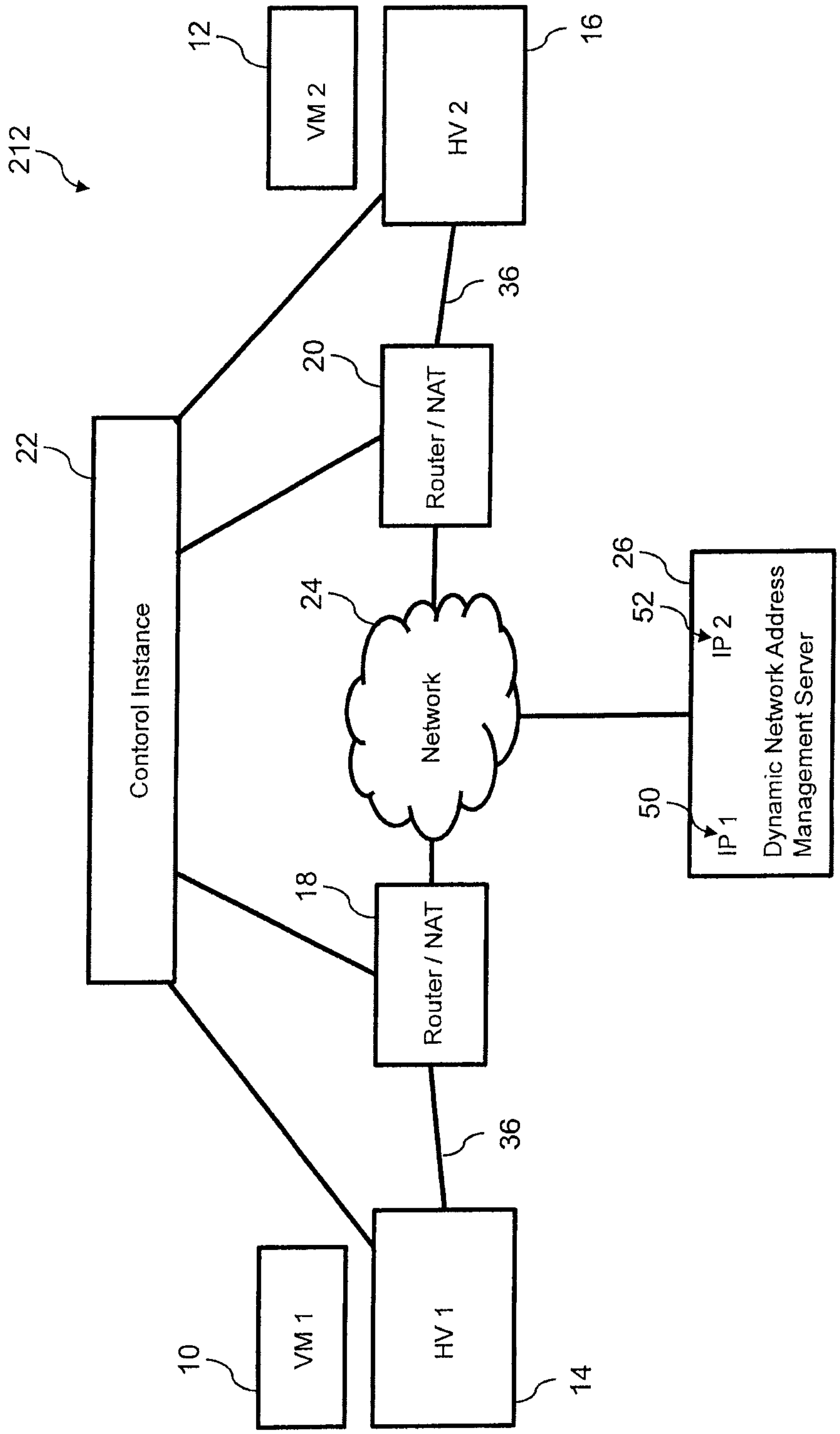
FIG. 2 the computer system of FIG. 1 during the suspend phase of the virtual machines.

FIG. 2 depicts the computer system 212 of FIG. 1 during the suspend phase of the virtual machines 10, 12. On suspend, both virtual machines 10, 12 give up their previous network address 50, 52 to the external dynamic network address management server 26. Thus the addresses 50, 52 get released. The official dynamic network address management server 26 then sets the addresses 50, 52 free for further use by other systems in the network 24.

Figure 3:
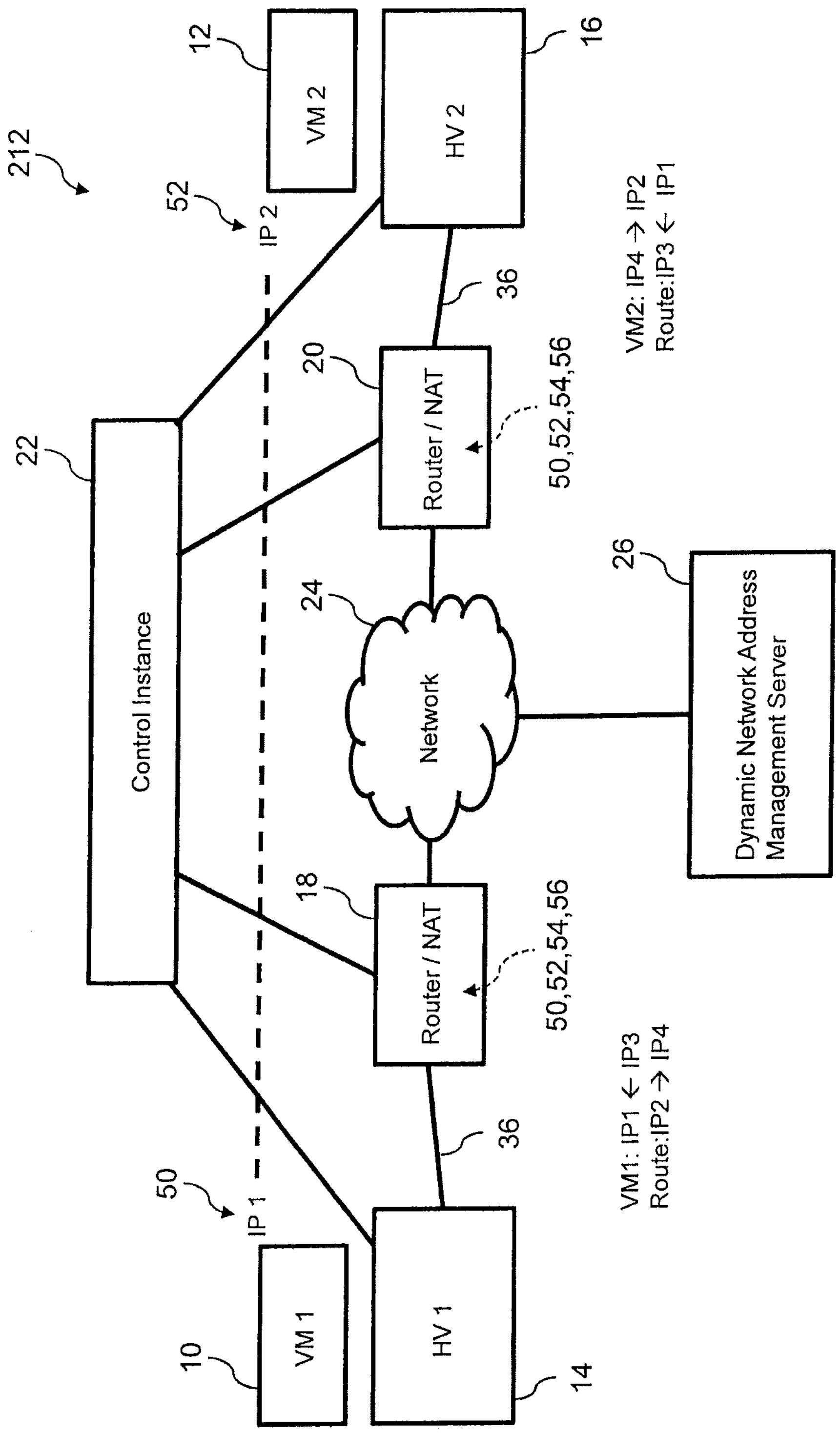
FIG. 3 the computer system of FIG. 1 after resuming the virtual machines.

FIG. 3 depicts the computer system 212 of FIG. 1 after resuming the virtual machines 10, 12. On resuming, both virtual machines 10, 12 require the previously used network addresses 50, 52 to establish connections between the virtual machines 10, 12 again. But the network addresses 50, 52 may no longer be available by the official external dynamic network address management server 26. Therefore, the control instance 22 looks up the configuration and passes this configuration to a network configuration daemon (NCD) to set up the routers 18, 20 and an internal DHCP server, e.g., to answer the DHCP requests of the virtual machines 10, 12 and assign the old network addresses 50, 52 again. The network configuration daemon requests a new network address 54, 56 from the official DHCP server 26 for the routers 18, 20. Then, the network configuration daemon configures the routers 18, 20 for network address translation for the new network addresses 54, 56. Further static routing for calls to the old network address 50, 52 from the other virtual machine 10, 12 to the new address 54, 56 is established.

Thus, assuming that the new network addresses 54, 56 are named IP3 and IP4, if VM1 10 calls VM2 12 by the old network address 52, IP2, the router 18 translates this address 52 to the new address 56, IP4, which is used for communication over the network 24. The second router 20 translates this address 56, IP4, back to the old address 52, IP2, being used in the network 36 between the router 20, the hypervisor 16 and the VM2 12. On the other side, if the VM2 calls VM1 10 by the old network address 50, IP1, the router 20 translates this address 50 to the new address 54, IP3, which is used for communication over the network 24. The first router 18 translates this address 54, IP3, back to the old address 50, IP1, being used in the network 36 between the router 18, the hypervisor 14 and the VM1 10.

During the suspend and resume cycle, clock states of the virtual machines 10, 12 are preserved to prevent network protocol timeouts on the preserved stateful active network connections between the virtual machines 10, 12.

Figure 4:
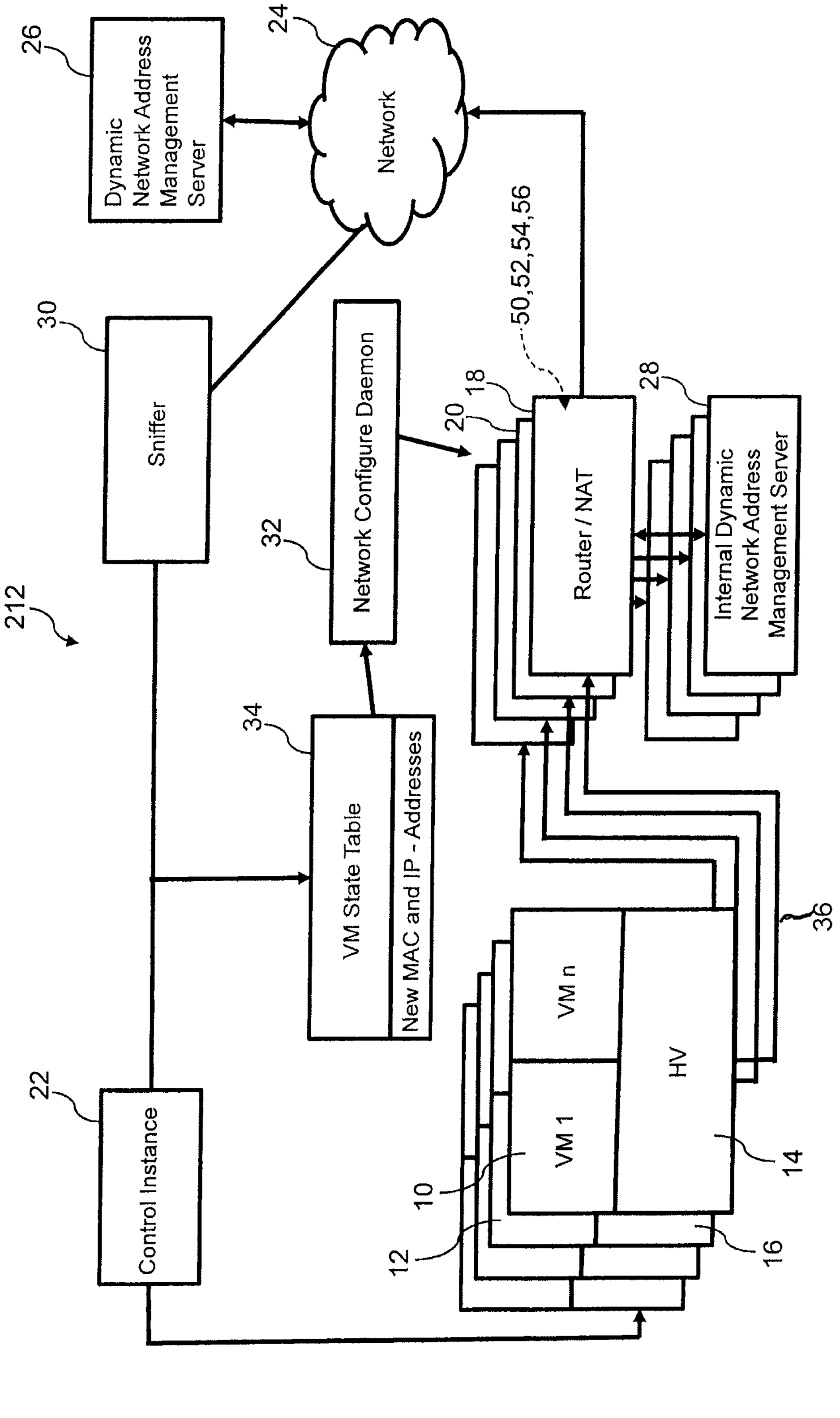
FIG. 4 an abstract implementation of an embodiment of the invention.

FIG. 4 gives an example of an abstract implementation of an embodiment of the invention. According to an aspect, routers 18, 20 are being set up on each hypervisor 14, 16, and an internal dynamic network address management server 28, which may advantageously be an internal DHCP server 28, is being set up on each router 18, 20. A hypervisor 14, 16 may control a number n of virtual machines 10, 12, named VM1 to VMn, where n is a natural number. Several hypervisors 14, 16 with virtual machines 10, 12 together with routers 18, 20 and internal dynamic network address management servers 28 are shown in FIG. 4, but only two of them each are referenced by reference numerals.

Upon resuming the virtual machines 10, 12, the routers 18, 20 are requesting new network addresses 54, 56 from the external dynamic network address management server 26, e.g. a DHCP server 26, being connected to the network 24. The routers 18, 20 are mapping network addresses 50, 52 used before suspending the virtual machines 10, 12 to the new network addresses 54, 56. The internal dynamic network address management server 28 is set up to assign the network addresses 50, 52 to MAC addresses of network interfaces of the virtual machines 10, 12. Thus, requests to the external dynamic network address management server 26 may be answered by an internal dynamic network address management server 28 via the network 36 using the old network addresses 50, 52, which will only be valid in this isolated network segment 36. For this purpose network address translation by the routers 18, 20 is used for communicating via the network 24. The control instance 22 is provided including at least one of the following: a list of suspended virtual machines 10, 12; a list of network addresses 50, 52, 54, 56 being officially assigned; a list of MAC addresses for each network interface assigned to a suspended virtual machine 10, 12. This information may be stored in a VM state table 34, connected to the control instance 22. For resuming the virtual machines 10, 12, the table 34 as a virtual machine state table keeps track of mapping the original network addresses 50, 52, to the newly assigned network addresses 54, 56 and the states of running and suspended virtual machines 10, 12.

A network configure daemon 32 is used for setting up the routers 18, 20 and the routing on the hypervisors 14, 16, as well as configuring the internal dynamic network address management server 28. Therefore, the network configure daemon 32 further gathers network addresses 50, 52, 54, 56 and states of running and suspended virtual machines 10, 12; as well as sets up network interfaces for the virtual machines 10, 12 on the hypervisors 14, 16. By this way, stopping a network traffic in case of suspending the virtual machines 10, 12 and resuming the network traffic in case of resuming the virtual machines 10, 12 may advantageously be achieved.

In case of suspending the virtual machines 10, 12, the network configure daemon 32 further deconfigures network address translation rules; releases network addresses 50, 52; deconfigures network interfaces; and deconfigures mapping of MAC addresses to network addresses 50, 52 in the internal dynamic network address management server 28.

In case of resuming the virtual machines 10, 12, the network configure daemon 32 further configures network interfaces; requests new network addresses 54, 56 from the external dynamic network address management server 26; configures mapping of MAC addresses to network addresses 50, 52 in the internal dynamic network address management server 28; and sets up network address translation rules for translating network addresses 50, 52 to new network addresses 54, 56.

A sniffer 30 is used to collect network addresses 50, 52, 54, 56 associated with MAC addresses of virtual machines 10, 12 from data packages transferred via the network 36. The sniffer 30 is to access the data packages within the same subnet as each virtual machine 10, 12 is located in, so that the IP addresses and MAC addresses are the original addresses.

Figure 5:
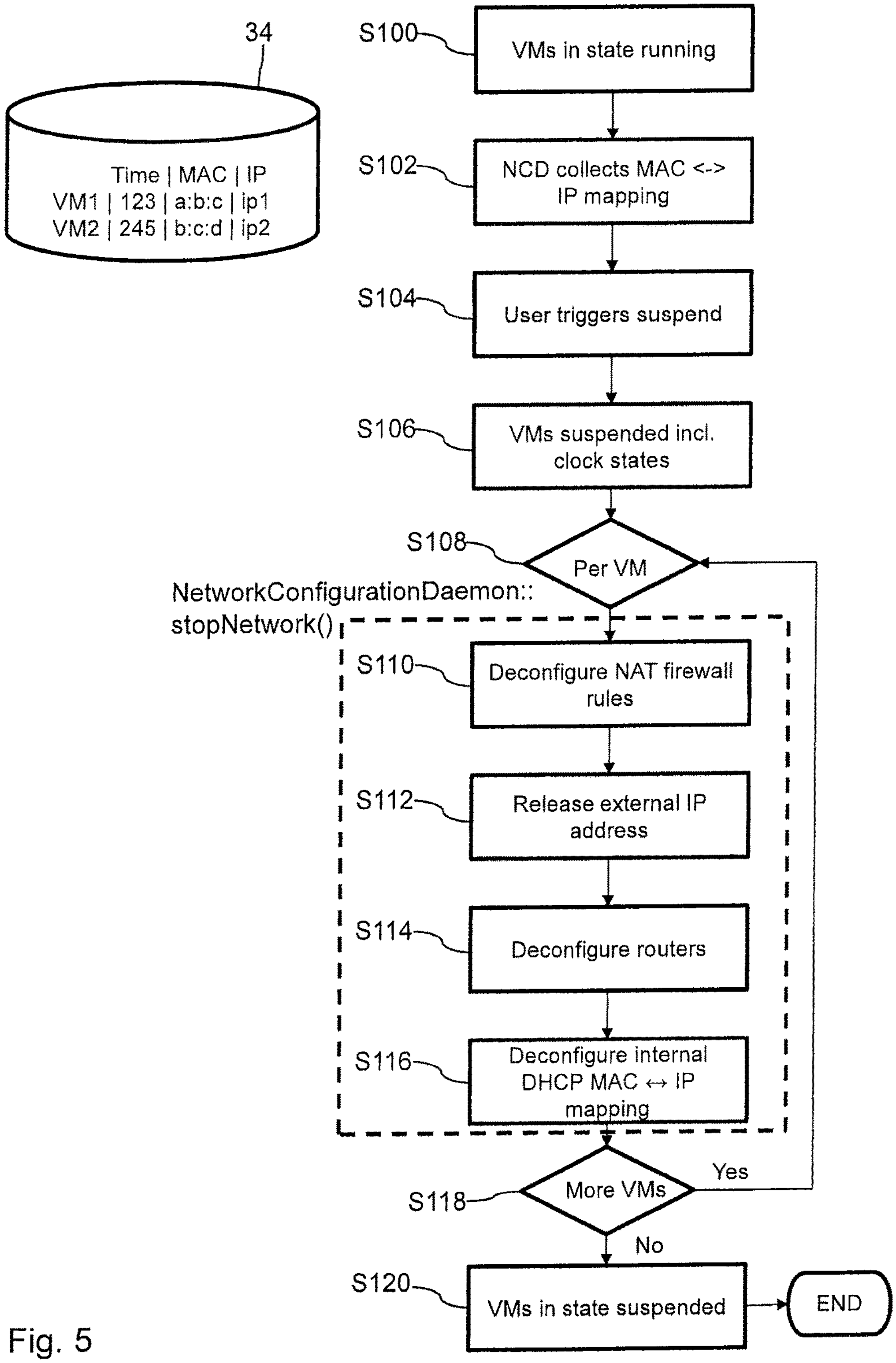
FIG. 5 a flowchart of a process for suspending virtual machines according to an embodiment of the invention.

FIG. 5 depicts one example of a flowchart of a process for suspending virtual machines according to an embodiment of the invention. At the beginning, in step S100, the virtual machines are in the state running. Next, in step S102, the network configuration daemon collects the mapping of the MAC addresses of the virtual machines to the network addresses of the virtual machines. In step S104, the user triggers the suspending of the virtual machines. Then, in step S106, the virtual machines are suspended including their clock states. For suspending, according to one or more aspects, the network configuration daemon performs a stopNetwork( ) command for each virtual machine (step S108) by deconfiguring the rules of the network address translation (NAT) in step S110, followed in step S112 by releasing the external network address of the virtual machine. Routers are deconfigured in step S114, and in step S116, the internal dynamic network address management server is deconfigured concerning the mapping of MAC address to the network address. The stopNetwork( ) command is repeated with step S118 for other virtual machines. The empty brackets of the stopNetwork( ) command expression indicate that parameters have to be added between the brackets. Finally, the virtual machines are in the state suspended, step S120. The VM Identification, clock state, MAC address and network address mapping is shown in table 34 in the FIG. 5.

An example of an application programming interface (API) for network configuration as may be provided by the network configuration daemon as stopNetwork( ) command may look like this:

```
stopNetwork( vm__internal__eth__interface,
             vm__external__eth__interface,
             vm__internal__ip__address,
             external__ip__address)
```

with eth_interface being a virtual interface adapter and ip_address being a network address of a virtual machine.

Figure 6:
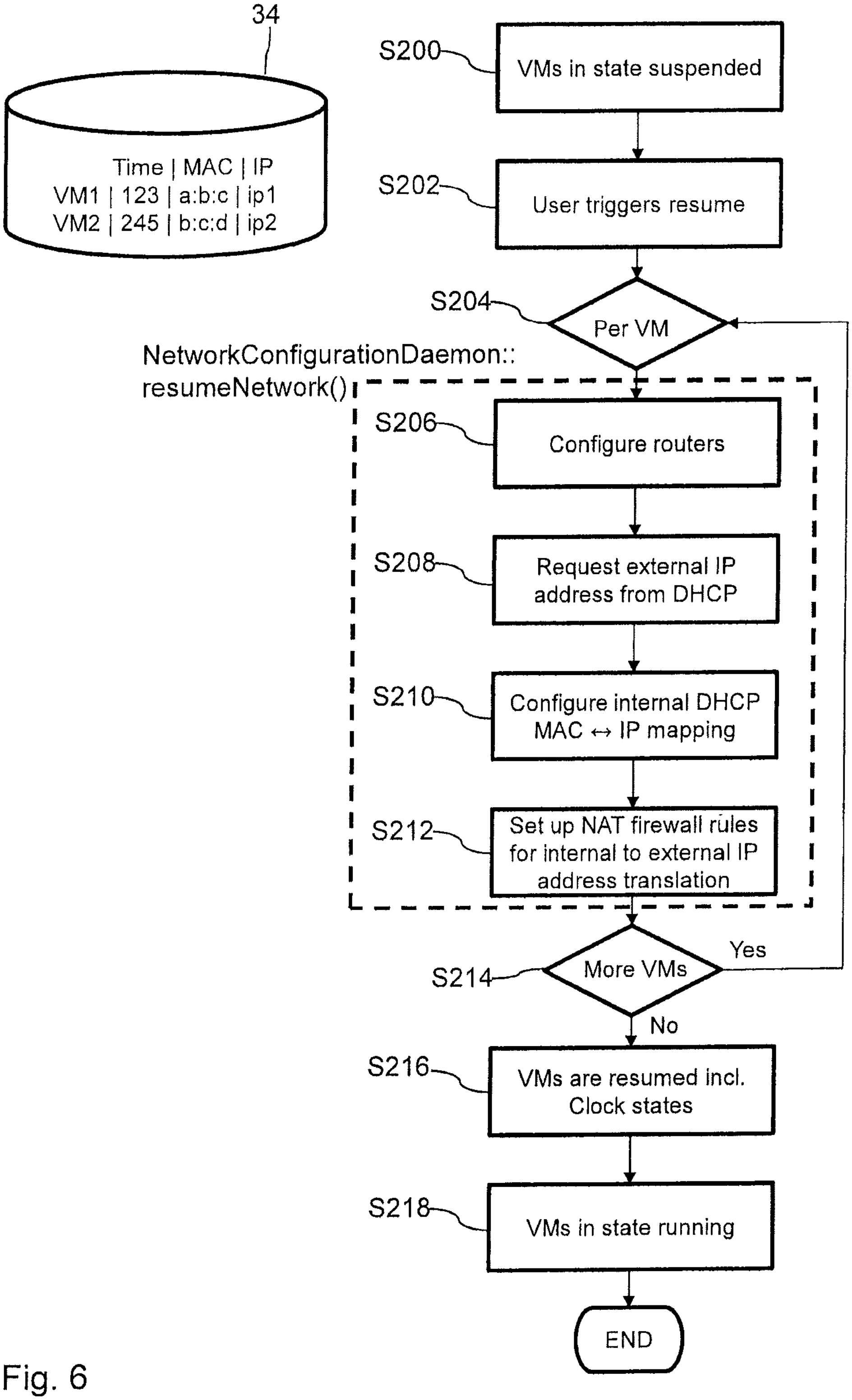
FIG. 6 a flowchart of a process for resuming virtual machines according to an embodiment of the invention.

FIG. 6 depicts one example of a corresponding flowchart of the process for resuming virtual machines according to an embodiment of the invention. In step S200, the virtual machines are in a state suspended. If the user triggers the resuming of the virtual machines in step S202, a resumeNetwork( ) command by the network configure daemon is initiated for each virtual machine in step S204, which starts by configuring routers of the virtual machine in step S206, followed by requesting an external network address from the official external dynamic network address management server. Next, the mapping of the MAC addresses of the virtual machine to the originally assigned network address is configured in step S210, and then, in step S212, rules for the internal (originally assigned) to external (newly requested) network address translation are set up. The resume Network( ) command is repeated for other virtual machines with step S214. Finally, in step S216, the virtual machines are resumed with their corresponding clock states, such that the virtual machines are running in step S218.

An example of an application programming interface (API) for network configuration as may be provided by the network configuration daemon as resumeNetwork( ) command may look like this:

```
resumeNetwork(vm__internal__eth__interface,
              vm__external__eth__interface&,
              vm__internal__ip__address,
              external__ip__address&)
```

with eth_interface being a virtual interface adapter and ip_address being a network address of a virtual machine.

Commands to configure a router for network address translation, as used in the resumeNetwork( ) command may look in a Linux-implementation like the following:

Set up an interface to gather an external network address:

```
ifconfig <vm__ext__interface> 0.0.0.0 0.0.0.0
dhclient <vm__ext__interface>
```

Return a new network address back to the configuration daemon;

Set up masquerading for an internal network address:

```
iptables -t nat -A PREROUTING -i <vm__ext__interface> -d
<external ip> -j DNAT -to <internal IP>
```

Set up a route for other VM's new network address:

```
iptables -t nat -A PREROUTING -i <vm__ext__interface> -d
<old other vm ip> -j DNAT -to <new other vm ip>
```

Reroute DHCP requests:

```
iptables -t nat -A PREROUTING -p tcp -i <vm__interface> --dport
67:68 -j DNAT -to DH <internal__dhcp__ip>:67-68
```

Figure 7:
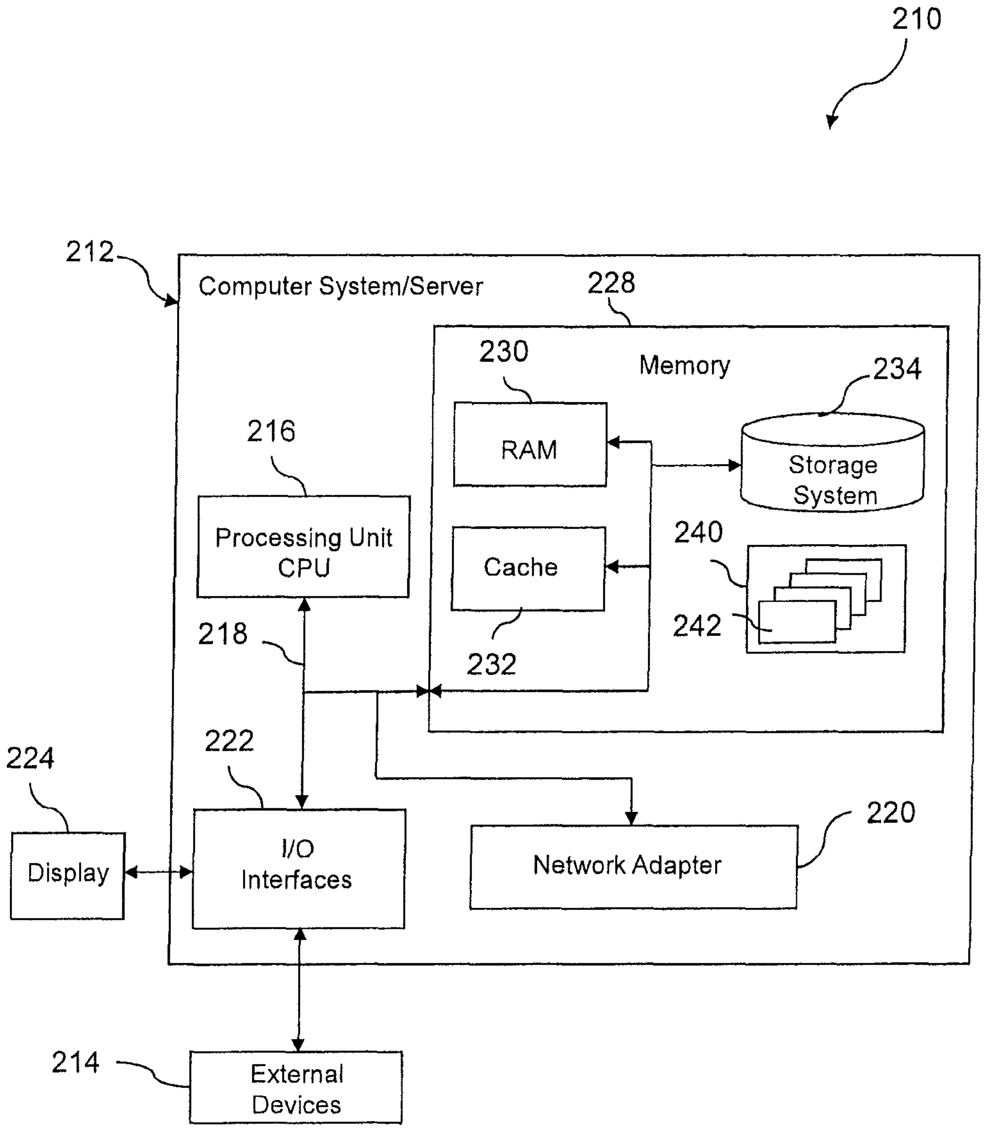
FIG. 7 an example embodiment of a data processing system for executing a method according to one or more aspects of the invention.

Referring now to FIG. 7, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an Operating System, one or more application programs, other program modules, and program data. Each of the Operating System, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

As described herein, a method is provided for preserving stateful network connections between a first virtual machine and at least a second virtual machine during a suspend and resume cycle, the virtual machines being interconnected by a network, wherein a control instance is provided to manage a routing of network traffic of the virtual machines to the network. The method includes, e.g., in case of a suspend operation, the control instance tracking network addresses of each virtual machine. Further, in case of a resume operation, the method includes, e.g., the control instance setting up a router for each virtual machine and requesting new network addresses for each router; as well as the control instance configuring a network address translation on the router assigned to each virtual machine to map the new network addresses to the network addresses used before suspending the virtual machines.

Thus, if a setup spanning multiple virtual machines on one or more hypervisors gets suspended, it may be ensured that during a resume operation the virtual machines get assigned the same network address as they had before. This can be achieved by reserving the network addresses while the virtual machines are suspended. Such reservation has the drawback that it may lead to shortages of available network addresses. According to one aspect, the problem of not enough available network addresses is avoided.

One or more aspects may be used for preserving stateful network connections (e.g., TCP (Transmission Control Protocol) connections) between two or more virtual machines over a suspend and resume cycle while preserving the system times, the MAC (Media Access Control) addresses and the dynamically assigned network addresses by configuring individual network address translation (NAT) routers by a control instance.

System knowledge of the virtual machines, hypervisors and network structure in a cloud management environment is used, in one example. Routers and internal dynamic network address management servers, which may be internal DHCP servers, are configured on the system that runs the hypervisor. In another embodiment, routers and dynamic network address management servers may also run outside of such a system. On resuming the virtual machines, each router requests a new official network address, such as an IP address, and maps the original official network address to the new official network address. The control instance sets up the internal dynamic network address management server to assign the original official network address again to the MAC address of the network interface card (NIC) of the virtual machine. Thus, it is ensured that the official external dynamic network address management server, which may also be a DHCP server, is not reachable and the DHCP request will be answered internally. This setup is repeated for every connected hypervisor.

This may be achieved by using the network address translation (NAT) and the internal dynamic network address management server for resumed VM images to maintain the original network addresses for communication between the two or more connected VMs. Therefore, the control instance may keep track of a list of suspended virtual machines, a list of originally assigned network addresses and a list of MAC addresses for each NIC assigned to a suspended VM.

Further, a computer program product is provided for preserving stateful network connections between a first virtual machine and at least a second virtual machine during a suspend and resume cycle, the virtual machines being interconnected by a network, the computer program product including a computer readable storage medium having program instructions embodied therewith, the program instructions executable by a computer to cause the computer to perform a method including: in case of a suspend operation, the control instance tracking network addresses of each virtual machine. Further, in case of a resume operation, the method includes the control instance setting up a router for each virtual machine and requesting new network addresses for each router; as well as the control instance configuring a network address translation on the router assigned to each virtual machine to map the new network address to the network address used before suspending the virtual machines.

Further, a data processing system for execution of a data processing program is provided, including computer readable program instructions for performing the method described above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, Firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of preserving stateful network connections between virtual machines during a suspend and resume cycle, the virtual machines being interconnected by a network, the computer-implemented method comprising:

tracking, by a control instance, based on a suspend operation of a first virtual machine and a second virtual machine, network addresses of the first virtual machine and the second virtual machine;

setting up by the control instance, based on a resume operation, a first router for the first virtual machine and a second router for the second virtual machine, and requesting new network addresses for the first router and the second router;

configuring by the control instance network address translation on the first router and the second router assigned to the first virtual machine and the second virtual machine to map the new network addresses to the network addresses used before suspending the first virtual machine and the second virtual machine, wherein use of the network addresses used before suspending map to the new network addresses subsequent to suspending, such that the network addresses used with the first virtual machine and the second virtual machine before suspending are reused by the first virtual machine and the second virtual machine after resuming the first virtual machine and the second virtual machine; and managing a routing of network traffic of the first virtual machine and the second virtual machine to the network.

2. The computer-implemented method according to claim 1, further comprising:

setting up the first router on a first hypervisor and the second router on a second hypervisor; and based on resuming the first virtual machine and the second virtual machine:

requesting by the first router and the second router the new network addresses from an external dynamic network address management server being connected to the network;

mapping by the first router and the second router the network addresses previously used to the new network addresses; and setting up an internal dynamic network address management server to assign the network addresses to media access control (MAC) addresses of network interfaces of the first virtual machine and the second virtual machine and answering requests to the external dynamic network address management server.

3. The computer-implemented method according to claim 2, wherein the external dynamic network address management server is configured as a dynamic host configuration protocol server.

4. The computer-implemented method according to claim 2, wherein at least one of the first virtual machine or the second virtual machine is implemented as a container, and at least one of the first hypervisor or the second hypervisor is implemented as a container host or an operating system being able to start a container.

5. The computer-implemented method according to claim 1, wherein the control instance maintains a virtual machine state table comprising at least one of the following selected from a group consisting of:

a list of suspended virtual machines;

a list of network addresses being officially assigned; and a list of media access control addresses for each network interface assigned to a suspended virtual machine.

6. The computer-implemented method according to claim 1, further comprising using a network configure daemon to set up the first router and the second router and route on the first hypervisor and the second hypervisor, and to configure an internal dynamic network address management server.

7. The computer-implemented method according to claim 6, wherein the network configure daemon further performs:

gathering the network addresses, the new network addresses, and states of running and suspended virtual machines; and setting up network interfaces for the first virtual machine and the second virtual machine on the first hypervisor and the second hypervisor.

8. The computer-implemented method according to claim 7, wherein the network configure daemon, based on suspending the first virtual machine and the second virtual machine, further performs:

deconfiguring network address translation rules;

releasing the network addresses;

deconfiguring the first router and the second router; and deconfiguring mapping of media access control addresses to the network addresses in the internal dynamic network address management server.

9. The computer-implemented method according to claim 7, wherein the network configure daemon, based on resuming the first virtual machine and the second virtual machine, further performs:

configuring the first router and the second router;

requesting the network addresses from an external dynamic network address management server;

configuring mapping of media access control addresses to the network addresses in the internal dynamic network address management server; and setting up network address translation rules for translating the network addresses to the new network addresses.

10. The computer-implemented method according to claim 1, wherein during the suspend and resume cycle, clock states of the first virtual machine and the second virtual machine are preserved.

11. The computer-implemented method according to claim 1, further comprising using a sniffer to collect the network addresses and the new network addresses associated with media access control addresses of the first virtual machine and the second virtual machine from data packages transferred via the network.

12. The computer-implemented method according to claim 11, wherein the sniffer is implemented in a same subnet of the network as the first virtual machine and the second virtual machine.

13. The computer-implemented method according to claim 1, further comprising using a table comprising the network addresses, the new network addresses, and states of running and suspended virtual machines for tracking the network addresses and the new network addresses.

14. The computer-implemented method according to claim 1, wherein the network is a physical network or a virtual network.

15. A computer program product for preserving stateful network connections between virtual machines during a suspend and resume cycle, the virtual machines being interconnected by a network, the computer program product comprising:

a computer readable storage medium readable by a processing circuit and storing instructions for execution by the processing circuit for performing a method comprising:

tracking, by a control instance, based on a suspend operation of a first virtual machine and a second virtual machine, network addresses of the first virtual machine and the second virtual machine;

setting up by the control instance, based on a resume operation, a first router for the first virtual machine and a second router for the second virtual machine, and requesting new network addresses for the first router and the second router;

configuring by the control instance network address translation on the first router and the second router assigned to the first virtual machine and the second virtual machine to map the new network addresses to the network addresses used before suspending the first virtual machine and the second virtual machine, wherein use of the network addresses used before suspending map to the new network addresses subsequent to suspending, such that the network addresses used with the first virtual machine and the second virtual machine before suspending are reused by the first virtual machine and the second virtual machine after resuming the first virtual machine and the second virtual machine; and managing a routing of network traffic of the first virtual machine and the second virtual machine to the network.

16. The computer program product according to claim 15, wherein the method further comprises:

setting up the first router on a first hypervisor and the second router on a second hypervisor; and based on the resume operation, the first virtual machine and the second virtual machine:

requesting by the first router and the second router the new network addresses from an external dynamic network address management server being connected to the network;

mapping by the first router and the second router the network addresses previously used to the new network addresses; and setting up an internal dynamic network address management server to assign the network addresses to media access control (MAC) addresses of network interfaces of the first virtual machine and the second virtual machine and answering requests to the external dynamic network address management server.

17. The computer program product according to claim 15, wherein during the suspend and resume cycle, clock states of the first virtual machine and the second virtual machine are preserved.

18. A computer system for preserving stateful network connections between virtual machines during a suspend and resume cycle, the virtual machines being interconnected by a network, the computer system comprising:

a memory; and a processor in communication with the memory, wherein the computer system is configured to perform a method, said method comprising:

tracking, by a control instance, based on a suspend operation of a first virtual machine and a second virtual machine, network addresses of the first virtual machine and the second virtual machine;

setting up by the control instance, based on a resume operation, a first router for the first virtual machine and a second router for the second virtual machine, and requesting new network addresses for the first router and the second router;

configuring by the control instance network address translation on the first router and the second router assigned to the first virtual machine and the second virtual machine to map the new network addresses to the network addresses used before suspending the first virtual machine and the second virtual machine, wherein use of the network addresses used before suspending map to the new network addresses subsequent to suspending, such that the network addresses used with the first virtual machine and the second virtual machine before suspending are reused by the first virtual machine and the second virtual machine after resuming the first virtual machine and the second virtual machine; and managing a routing of network traffic of the first virtual machine and the second virtual machine to the network.

19. The computer system according to claim 18, wherein the method further comprises:

setting up the first router on a first hypervisor and the second router on a second hypervisor; and based on the resume operation, the first virtual machine and the second virtual machine:

requesting by the first router and the second router the new network addresses from an external dynamic network address management server being connected to the network;

mapping by the first router and the second router the network addresses previously used to the new network addresses; and setting up an internal dynamic network address management server to assign the network addresses to media access control (MAC) addresses of network interfaces of the first virtual machine and the second virtual machine and answering requests to the external dynamic network address management server.

20. The computer system according to claim 18, wherein during the suspend and resume cycle, clock states of the first virtual machine and the second virtual machine are preserved.

* * * * *